United States Patent
Kim et al.

(10) Patent No.: US 7,864,134 B2
(45) Date of Patent: Jan. 4, 2011

(54) DISPLAY DEVICE OF A MOBILE PHONE HAVING A SUB MEMORY

(75) Inventors: Hyoung-Rae Kim, Suwon-si (KR); Wan-Jung Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1172 days.

(21) Appl. No.: 10/989,765

(22) Filed: Nov. 16, 2004

(65) Prior Publication Data
US 2005/0140566 A1    Jun. 30, 2005

(30) Foreign Application Priority Data
Dec. 10, 2003  (KR) ................... 10-2003-0089358

(51) Int. Cl.
  *G09G 5/00* (2006.01)
(52) U.S. Cl. ........................ 345/1.1; 455/574
(58) Field of Classification Search ................. 345/1.1, 345/1.3, 9, 30, 87, 90, 98, 100, 102, 103, 345/204; 348/564–569
See application file for complete search history.

(56) References Cited

U.S. PATENT DOCUMENTS 5,859,625 A  *  1/1999  Hartung et al. ............... 345/95
6,574,487 B1    6/2003  Smith et al. .................. 455/566
7,184,012 B1 *  2/2007  Kim .............................. 345/100
2004/0085480 A1 * 5/2004  Salzer et al. .................. 348/584
2004/0087351 A1 * 5/2004  Paver et al. .................. 455/574

FOREIGN PATENT DOCUMENTS

| JP | 02-218030 | 8/2002 |
| JP | 02-374333 | 12/2002 |
| KR | 01-016833 | 3/2001 |

OTHER PUBLICATIONS

English Abstract Only.

* cited by examiner

*Primary Examiner*—Amare Mengistu
*Assistant Examiner*—Jennifer Zubajlo
(74) *Attorney, Agent, or Firm*—F. Chau & Associates, LLC

(57) ABSTRACT

Provided is a display device of a mobile phone with a sub memory. The display device includes a display panel for displaying application data and state display data corresponding to a main image data signal used to display various application data and a sub image data signal including state display data and picture control signals, a sub memory for storing state display data and picture control signals for outputting state display data and picture control signals to the display panel, and a display driver which drives images or data to be displayed on the display panel.

20 Claims, 8 Drawing Sheets

DISPLAY DEVICE OF A MOBILE PHONE HAVING A SUB MEMORY

CROSS-REFERENCE TO RELATED APPLICATION

This application claims the priority of Korean Patent Application No. 2003-89358, filed on Dec. 10, 2003, in the Korean Intellectual Property Office, the disclosure of which is incorporated herein in its entirety by reference.

BACKGROUND OF THE INVENTION

1. Field of the Invention

The present invention relates to a display device, and more particularly to a display device of a mobile phone, which includes a sub memory.

2. Description of the Related Art

With the increase in mobile phone subscribers and the development of display technology, the mobile phone not only has a calling function but now includes various multimedia functions such as a camera function, a moving pictures display function, and a games function.

In addition, with the inclusion of multimedia functions the display device of the mobile phone has progressed from a light emitting diode (LED) device to a liquid crystal display (LCD) device and has changed from a black and white LCD to a color LCD. Furthermore, as the LCD window increases in size, a dual LCD folder type mobile phone has appeared with a main LCD window that can be closed and a sub LCD window that can operate on its own to reduce power consumption and protect the main LCD window.

Among mobile phones with multimedia functions one of the more popular functions is the camera function. The development of a mobile phone including a digital camera (e.g., a camera phone) has been delayed somewhat because of several factors such as unstable demand and supply, high price, and high power consumption. However, with the recent development of a mega pixel super extended graphics array (SXGA: 1280×1024) complementary metal oxide semiconductor (CMOS) image sensor, an increased supply of mega pixel camera phones has become a reality.

Although the resolution of camera phones is low at 300,000 pixels with a common intermediate format (CIF) (288×352) or video graphics array (VGA) (4802×6402), mega pixel camera phones have steadily spread throughout the world.

The appearance of mega pixel camera phones is not only a combination of the digital camera and mobile phone but also signals a change in paradigm. That is, with the emergence of mega pixel camera phones, ripple effects such as full-scale adoption of an application processor, the appearance of a high-resolution display device having a quarter video graphics array (QVGA) (320×240) or higher resolution, an increase in mobile phone memory capacity and acceleration of high-speed communication services simultaneously occur. In a similar case, when the poly sound phone was released, new services such as bell sound services and call connection sound services were provided.

With the inclusion of such application processors and display devices having resolutions greater than QVGA, the technology for reducing energy consumption in mobile phones and display drivers, which can realize various functions, has advanced.

After the communication service, code division multiple access 2000 (CDMA 2000) was introduced for mobile phones, various applications such as digital cameras, camcorders, LCDs, cards, memory, global positioning system (GPS)/Bluetooth, graphics/animation, and audio/sound have appeared for use with mobile phones leading to an overflow of the existing base band large scale integration (LSI) prompting the release of application processors that specialize in such applications.

The application processor of a mobile phone may be installed separately from the base band LSI or may be installed within the base band LSI. For example, a double-chip solution in which the application processor with necessary functions using the existing base band LSI can be installed separately from the base band LSI and is advantageous in that expansion, reduction, and diversification of various functions are easy and economical. However, because the double-chip solution uses two chips, an increase in substrate area for the two chips is inevitable.

A one-chip solution in which the application processor is installed inside the base band LSI provides compatibility between the base band LSI and application processor and individual environments thereof. However, the one-chip solution is disadvantageous in that it requires a high-priced integrated circuit (IC) with various functions beyond the needs of a mobile phone, and thus the expansion of multimedia functions is difficult.

SUMMARY OF THE INVENTION

The present invention provides a display driver capable of minimizing power consumed by a display device in a standby mode of a mobile communication terminal. The present invention also provides a mobile communication terminal capable of minimizing load on an application processor or a base band large scale integration (LSI) of the mobile communications terminal. The present invention also provides a dual folder type mobile communications terminal in which various application data and data regarding the state of the mobile communications terminal can be simultaneously displayed with minimum power consumption when a main or sub display device operates via a red, green, blue (RGB) interface, thereby increasing user convenience.

According to an aspect of the present invention, there is provided a display device comprising a display panel, which receives a main image data signal used to display various application data and a sub image data signal including state display data and a picture control signal, and displays the application data and state display data; a sub memory, which stores the state display data and the picture control signal and outputs the state display data and the picture control signal to the display panel; and a display driver, which controls an image or data so that the image or data is displayed on the display panel.

The display device may further include a row address decoder, which receives the state display data stored in the sub memory and maps the state display data onto a predetermined area of the display panel. The sub memory is refreshed with new sub image data when a new sub image data signal is input, the sub memory is not refreshed when the new sub image data signal is not input, and sub image data stored in the sub memory is output to the display panel.

When the application data is not displayed, the sub image data signal and the picture control signal may be input and stored in the sub memory, and only the stored state display data may be output. The state display data may be output to a predetermined area of the display panel.

The application data and the state display data may be displayed such that the application data and the state display data overlap in an identical display area when the state display data and the application data, which are stored in the sub memory, are simultaneously output to the same area. Also, the display device may further include an on-screen display (OSD) controller for controlling an overlap of data on the display panel such that the state display data is blocked by the application data, the state display data is semi-transparently displayed on the application data, or the application data is blocked by the state display data.

The display panel may be a mobile phone display device. The display panel may include a main display panel and sub display panel of a dual folder of a mobile phone. When the mobile phone is in a standby mode, the sub memory may operate as a memory for storing the data displayed on the sub display panel.

According to another aspect of the present invention, there is provided a display device comprising: a first display device, wherein the first display device is a main screen display; a second display device, wherein the second display device is a sub screen display; a sub memory, which stores state display data and a picture control signal output from a display controller, and outputs the state display data and the picture control signal to the first and second display devices; and a display driver, which drives one of an image and data on the first and second display devices; wherein the first and second display devices receive a main image data signal for displaying application data from the display controller, receive a state display data signal used to display the state display data from the sub memory and the picture control signal for controlling the display of the first and second display devices, and display one of the application data and the state display data in response to the picture control signal.

The display device further comprises a row address decoder, which receives the state display data stored in the sub memory, and maps the state display data onto an area of one of the first display device and the second display device. The sub memory does not refresh one of the first display device and the second display device where the state display data is displayed, unless the picture control signal, which displays one of a changed state display data signal and application data signal, is not input.

In one of the first display device and the second display device in which the state display data and application data are displayed, the sub memory does not refresh a portion of the display area in which the state display data is displayed unless the picture control signal which displays a changed state display data signal is not input. In one of the first display device and the second display device in which the application data is displayed, the sub memory does not output a signal to one of the first display device and the second display device unless the picture control signal which displays the state display data signal is not input.

The state display data is output to one of a first portion of the first display device and a first portion of the second display device. The application data and the state display data are displayed such that the application data and the state display data overlap in a first display area when the state display data and the application data, which are stored in the sub memory, are output to the first display area.

The display device further comprises an OSD controller for controlling an overlap of data on the display panel such that one of the state display data is blocked by the application data, the state display data is semi-transparently displayed on the application data, and the application data is blocked by the state display data. The display control of the state display data and the application data is performed using the display controller. When the display device is in a standby mode, the sub memory operates as a memory for storing data which is displayed on the second display device.

BRIEF DESCRIPTION OF THE DRAWINGS

The above and other features of the present invention will become more apparent by describing in detail exemplary embodiments thereof with reference to the attached drawings, in which.

DETAILED DESCRIPTION OF THE INVENTION

Figure 1:
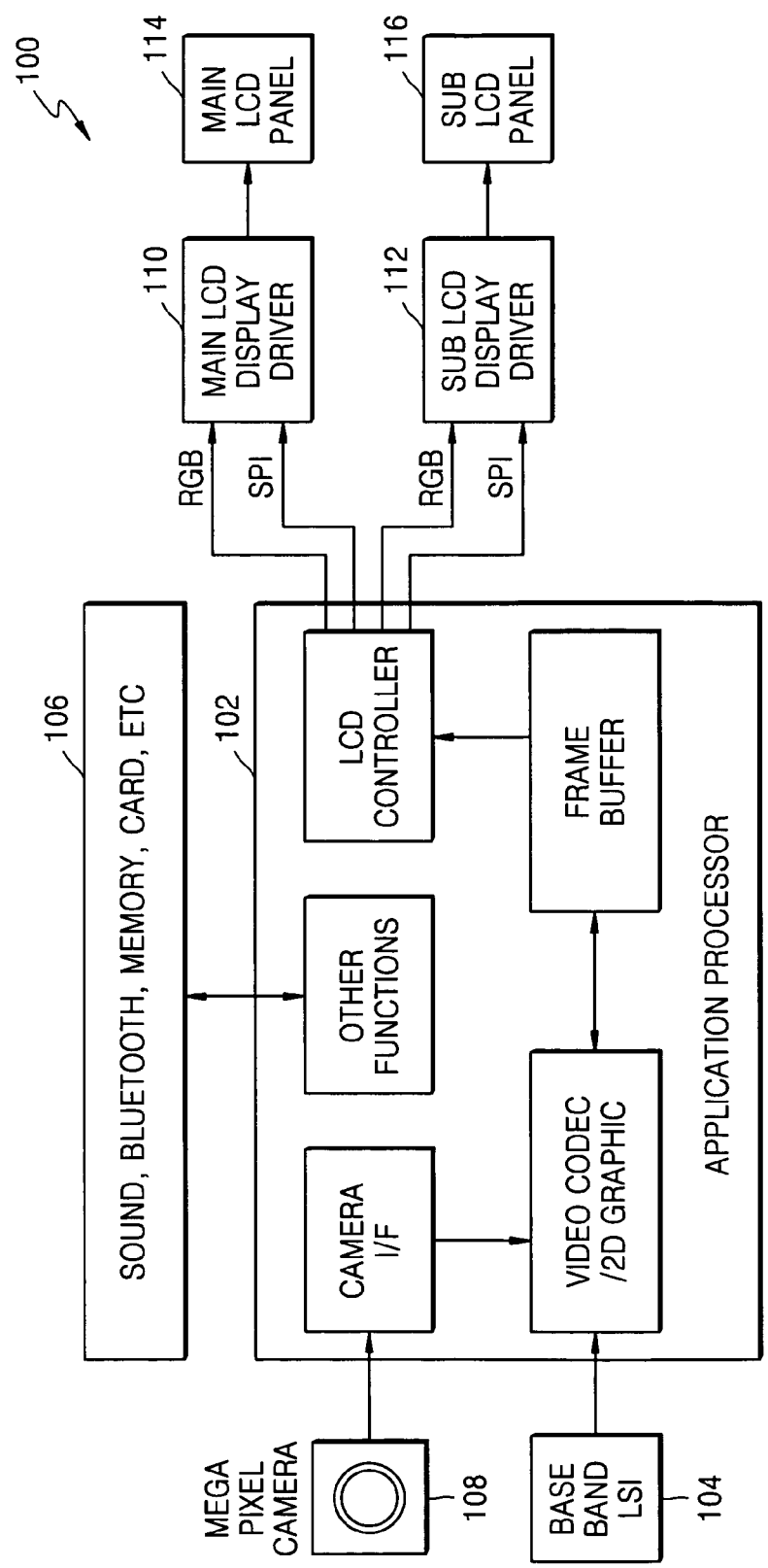
FIG. 1 is a block diagram a conventional mobile phone, which has various functions.

FIG. 1 is a block diagram of a conventional mobile phone 100, which has various functions. The mobile phone 100 of FIG. 1 includes an application processor 102, a base band large scale integration (LSI) 104, a multimedia device 106 such as sound, Bluetooth, memory, card, etc., a digital camera 108, a main liquid crystal display (LCD) display driver 110, a sub LCD display driver 112, a main LCD display panel 114, and a sub LCD display panel 116.

For the main LCD display panel 114 a thin film transistor (TFT) and a thin film diode (TFD) are commonly used and various application data such as moving pictures, camera pictures, and games are transmitted to the main LCD display driver 110 of the main LCD display panel 114 through a frame buffer memory installed in the application processor 102. Such data is transmitted as red, green, blue (RBG) data of n bits from an LCD controller of the application processor 102. Therefore, because there is no need for a memory device a memoryless LCD driver is used.

For the sub LCD display panel 116, a super twisted nematic LCD (STN LCD), a semi-transparent TFT, or an organic light-emitting diode (OLED) may be used which has a lower resolution and is adequate for low power consumption. Data displayed on the sub LCD display panel 116 mainly includes data indicating the state of the mobile phone 100 such as time, date, power, and antenna.

Figure 2A:
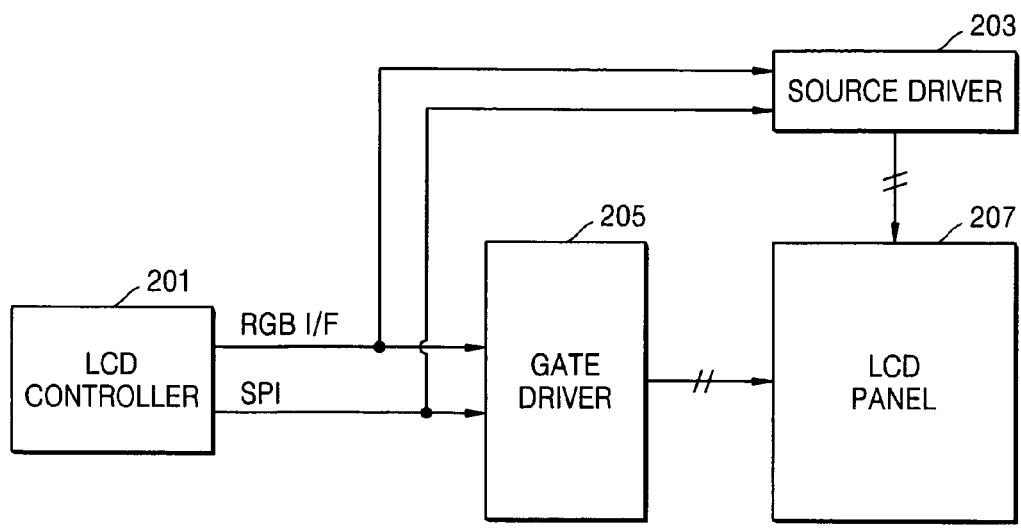
FIGS. 2A through 2C are block diagrams of a liquid crystal display (LCD) device of a conventional mobile phone.
Figure 2B:
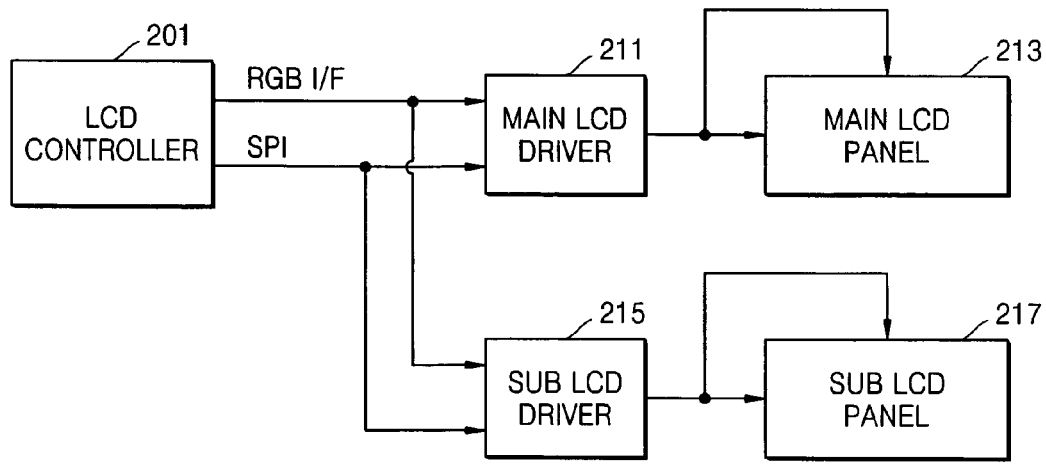
Figure 2C:
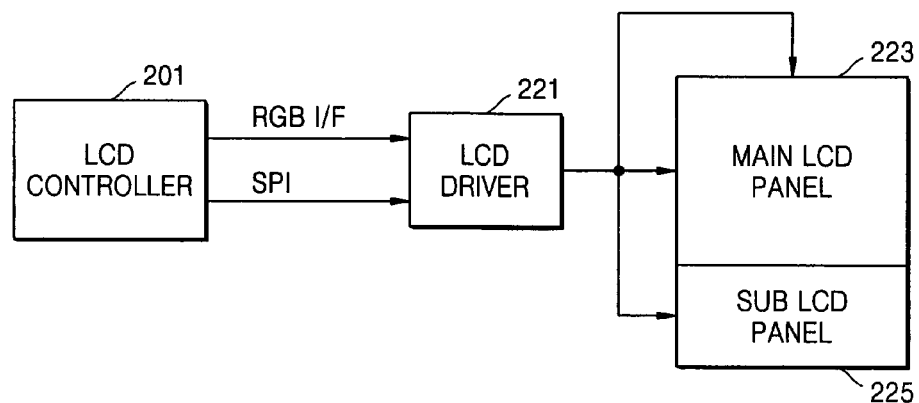

FIGS. 2A through 2C are block diagrams illustrating LCD devices of conventional mobile phones. In particular, FIG. 2A is a block diagram of an LCD device of a bar type mobile phone which has a single display device. The mobile phone of FIG. 2A includes an LCD controller 201 installed within an application processor, a source driver 203, a gate driver 205, and an LCD panel 207 which is a display means. An LCD driver (not shown) includes the source driver 203 and the gate driver 205, which are used to control a scanning electrode.

The LCD panel 207 is for displaying images or data, that is, it is a virtual memory that only has position information.

The LCD controller 201 transmits RGB data used to express moving pictures or static images using the source driver 203 and the gate driver 205, data indicating the state of the mobile phone, and serial peripheral interface (SPI) signals which are indication control signals. The data are transmitted to and displayed on the LCD panel 207.

FIG. 2B is a block diagram illustrating a dual folder type LCD device with two display devices in which an LCD driver is installed in each of the two display devices. Referring to FIG. 2B, the mobile phone includes the LCD controller 201, a main LCD driver 211, and a sub LCD driver 215 and each driver 211 and 215 includes corresponding panels 213 and 217.

The LCD controller 201 transmits RGB data used to express moving pictures or still images, data indicating the state of the mobile phone, and SPI signals, which are indication control signals, using the main LCD driver 211 and/or the sub LCD driver 215. The main LCD driver 211 and sub LCD driver 215 may include a frame memory, which stores control signals used to realize characters or numbers and shapes that are sent from the LCD controller 201.

FIG. 2C is a block diagram illustrating an LCD device that can be made light and slim, and that drives two display windows using one LCD driver 221 in a dual folder type mobile phone, which has two LCD windows: a main LCD panel 223 and sub LCD panel 225. Referring to FIG. 2C, the dual folder type mobile phone includes an LCD controller 201, the LCD driver 221, the main LCD panel 223 and the sub LCD panel 225. The main LCD panel 223 includes n signal electrodes and 1 through k−1 scanning electrodes and the sub LCD panel 225 includes n signal electrodes and scanning electrodes of a number from k to m. In other words, the two LCD windows may be simultaneously controlled by driving n number of signal electrodes and 1 through m scanning electrodes using only the LCD driver 211.

Figure 3:
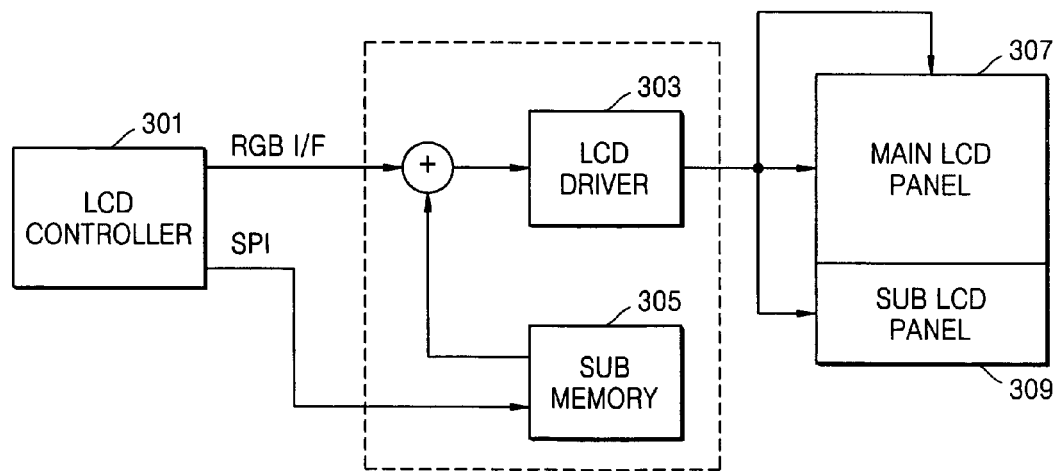
FIG. 3 is a block diagram of an LCD device of a mobile phone according to an exemplary embodiment of the present invention.

FIG. 3 is a block diagram of a LCD device of a mobile phone according to an exemplary embodiment of the present invention. Referring to FIG. 3, the mobile phone includes an LCD controller 301; an LCD driver 303 which receives RGB data from the LCD controller 301; a sub memory 305 which receives and stores data such as a state of an antenna and battery, and time and control signals from the LCD controller 301; and a main LCD panel 307 and a sub LCD panel 309 both of which display data input from the LCD driver 303.

The sub memory 305 of the mobile phone is a memory for storing and outputting static data such as the time and the state of the battery. That is, the sub memory 305 temporarily stores static data and outputs it using a latch of a source driver when an application processor is in a standby mode or when the application processor outputs images such as moving pictures, static pictures, games, and call images, which may be displayed simultaneously with indication display data of the mobile phone.

In other words, main image data of various applications is directly input to the LCD driver 303 via an RGB interface. Direction or register setting control signals are input to the LCD driver 303 via a serial peripheral interface (SPI). The data input to the LCD driver 303 drives the main LCD panel 307 through the source driver, which drives signal electrodes, and a gate driver, which drives scanning electrodes.

When the mobile phone is in the standby mode, the sub memory 305 can output the data stored therein to the LCD driver 303 without driving the application processor so that the data can be displayed on the LCD panel (e.g., the main and sub LCD panels 307 and 309), until a new control signal or data is input. Therefore, because there is no need to continuously refresh the LCD panel and output the display image from the LCD controller 301, low power consumption can be realized.

A low amount of power is, however, required because the sub LCD panel 309 is always turned on even when the mobile phone is in the standby mode. In addition, and while in the case of displaying static pictures such as time, only a deciphering operation has to be carried out after initially recording the data in the sub memory 305 on the LCD panel unless performing a refresh operation.

Thus, when the application processor is in the standby mode in which applications are not used, it does not have to perform processing for the sub LCD panel 309 and transfer high-speed data to the LCD driver 303. Thus, unnecessary power consumption can be reduced.

Figure 4:
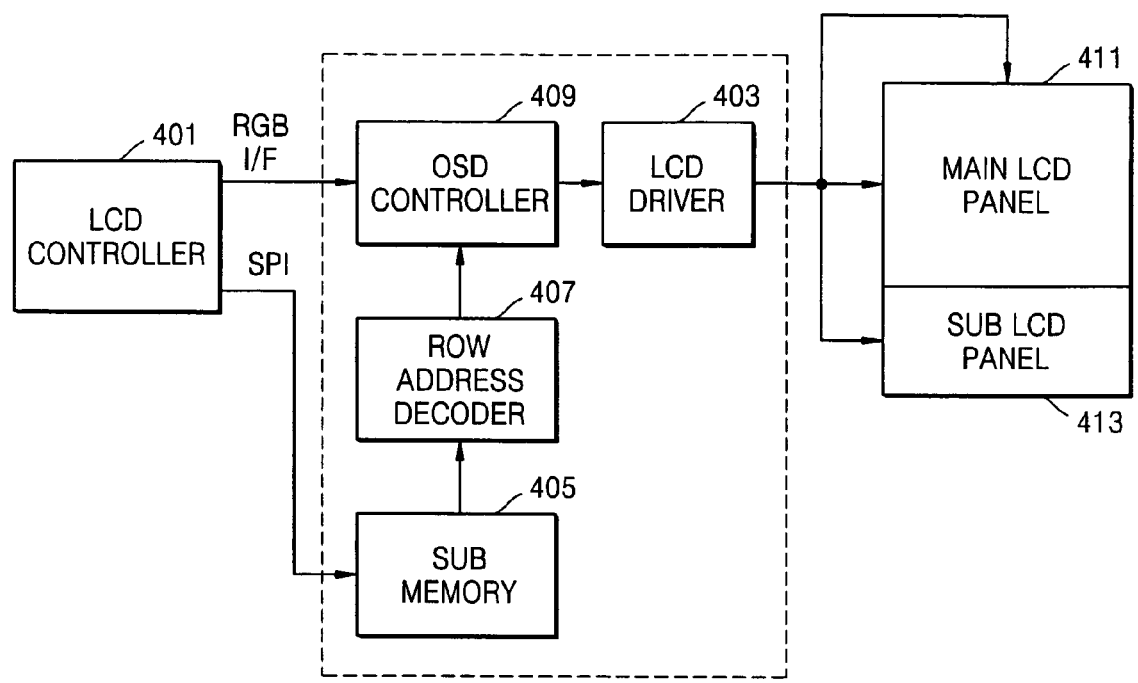
FIG. 4 is a block diagram of a LCD device of a mobile phone according to another exemplary embodiment of the present invention.

FIG. 4 is a block diagram illustrating an LCD device of a mobile phone according to another exemplary embodiment of the present invention. Referring to FIG. 4, the LCD device includes an LCD controller 401, an LCD driver 403, which drives a display device, a sub memory 405 for storing SPI signals, a row address decoder 407 for mapping data output from the sub memory 405 to a predetermined position of an LCD panel (e.g., main and sub LCD panels 411 and 413), an on screen display (OSD) controller 409 for overlapping SPI data on the RGB data, the main LCD panel 411, and the sub LCD panel 413.

The row address decoder 407 adequately positions the SPI data, that is, data regarding the time and the state of the antenna, at a predetermined area on the main and sub LCD panels 411 and 413 when a folder of a dual mobile phone is closed, when the folder is opened, when the data is simultaneously output with the application data, or when only the SPI data is output.

For example, when the folder of the dual folder mobile phone is closed, the row address decoder 407 prevents the outputting of data from the main LCD panel 411, controls the state of the antenna, mail, and battery to be displayed on an upper portion of the sub LCD panel 413, displays data such as time and date, etc. in a middle area of the sub LCD panel 413, and controls the menu to be displayed at a lower area.

When the OSD controller 409 outputs the application data output from an RGB interface (I/F) and the SPI data output from the sub memory 405 on the same area of the LCD panel, the OSD controller 409 can express various images by changing an α-bending value to different percentages such as, 0%, 50%, and 100%, etc. For example, when the overlapping value is set at 0%, the OSD controller 409 outputs only application data when the static image output from the sub memory 405 overlaps the display position of the application data.

In addition, when the overlapping value is set at 50% and the display position of the static picture output from the sub memory 405 overlaps the application data, the application data and the static image are mixed with 50% of each and output so that they can be displayed together. Furthermore, when the overlapping value is set at 100% and the display position of the static image, which is output from the sub memory 405 overlaps with the application data, the OSD controller 409 only outputs the SPI data and controls static images such as time, etc. to be output to a portion of the application data image.

Figure 5:
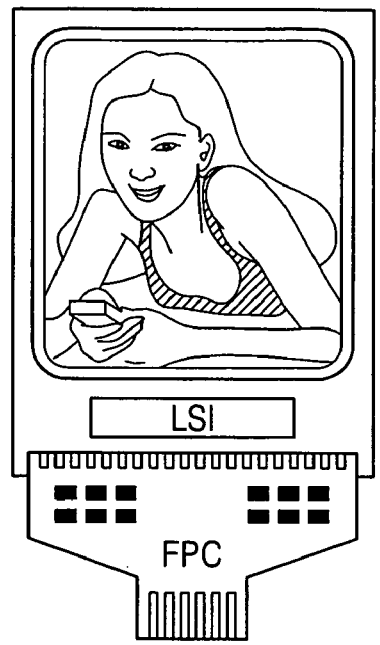
FIG. 5 illustrates a display screen for displaying application data using a red, green, blue (RGB) interface.

FIG. 5 illustrates application data on a display screen using an RGB interface. In detail, FIG. 5 illustrates the case in which, when using various applications such as static pictures, moving pictures, entertainment, and games on a bar type mobile phone, which only uses a main display panel, the application data is displayed on the main display panel. FIG. 5 is also used to illustrate an example in which the camera image is checked using a mobile phone in which a camera is installed.

Figure 6:
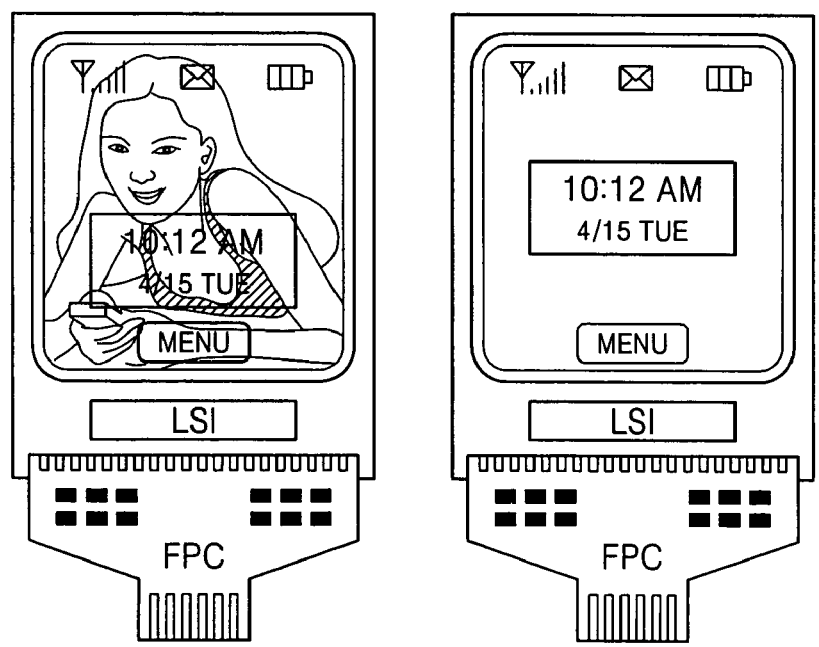
FIG. 6 illustrates a display screen using an RGB interface and a sub memory of a bar-type mobile phone as shown in FIG. 5.

FIG. 6 illustrates a display screen using an RGB interface and sub memory in a bar type mobile phone as shown in FIG. 5. Referring to FIG. 6, the figure on the left illustrates an example of driving a quarter video graphics array (QVGA) version main LCD panel with application data using an RGB interface from an application processor, and data such as time, date, battery, and a state of an antenna, stored in a sub memory using SPI signals from an application processor.

The figure on the right of FIG. 6 is an example of displaying the main LCD panel with only the data stored in the sub memory. In a mobile phone in which the display panel is a single main LCD panel such as a bar type phone or a smart phone the main LCD panel is used as a display screen in a standby mode. Such a standby mode can provide the effect of a low power operation in which a static image is displayed using only a deciphering operation on data stored in the sub memory without operating the application processor.

Figure 7:
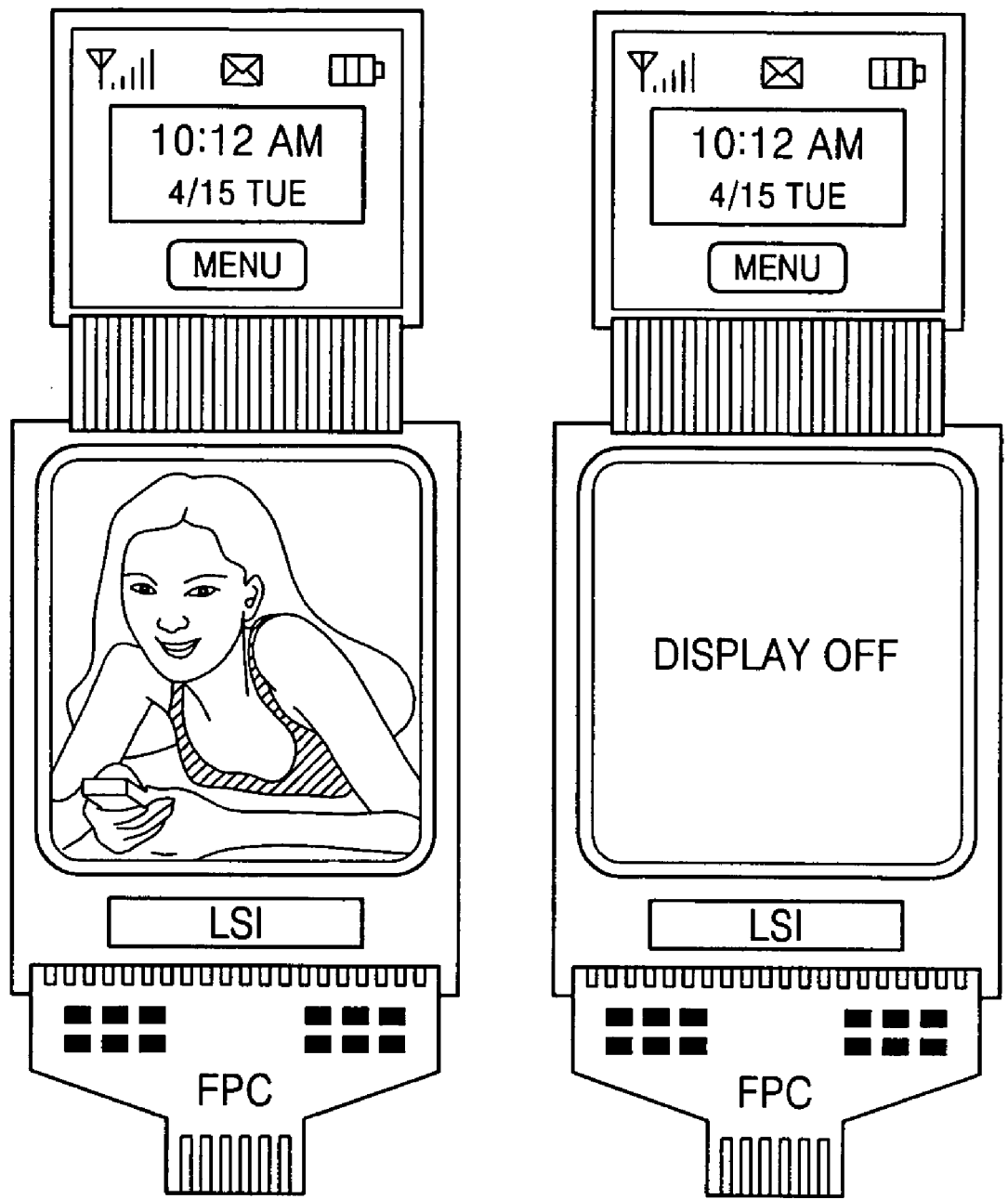
FIG. 7 illustrates a display screen of a dual folder type mobile phone that simultaneously drives a main LCD panel and sub LCD panel.

FIG. 7 illustrates an example of a screen of a dual folder type mobile phone that simultaneously drives a main LCD panel and a sub LCD panel. Referring to FIG. 7, the dual folder type mobile phone is commonly used to simultaneously drive a quarter common intermediate format (QCIF) version main LCD panel and a 104×80 sub LCD panel. Data is received through an RGB interface from an application processor in the main LCD panel and data indicating the state of the mobile phone is received from the application processor in the sub LCD panel and data is read and displayed after being stored in a sub memory.

The left figure of FIG. 7 is an example of a user viewing the main LCD panel when opening a folder of the mobile phone and driving both the main LCD panel and sub LCD panel while using the mobile phone.

The right figure of FIG. 7 is an example of the user driving only a sub display while the mobile phone is closed in a standby mode. As a mobile phone is used most of the time in such a standby mode, power consumption in the display device according to the present invention can be reduced because most of the operations of the processor can be stopped in the standby mode. In addition, when driving only the sub LCD panel it is possible to use the mobile phone more efficiently by installing a timing controller within the LCD controller or LCD driver.

Figure 8:
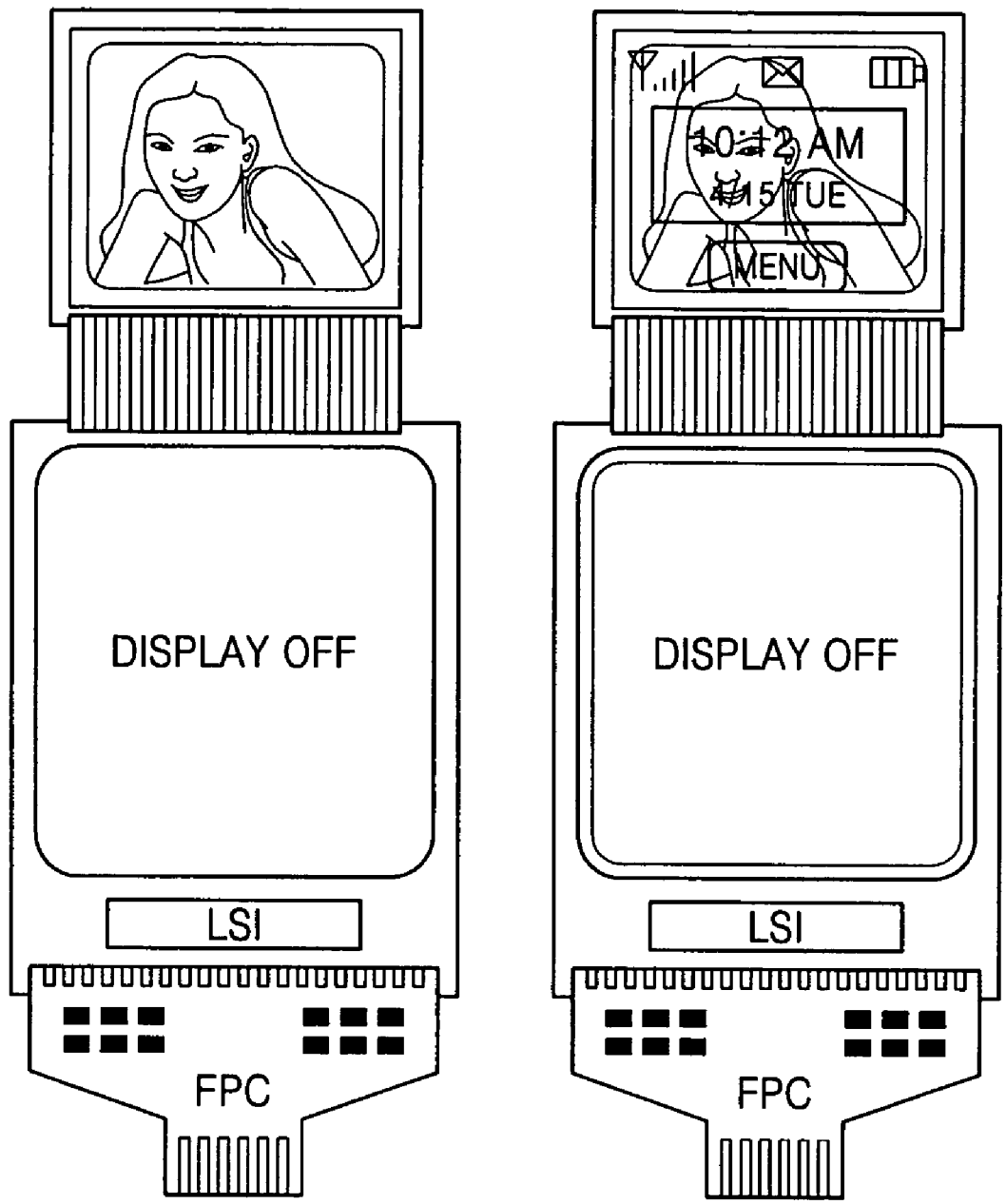
FIG. 8 illustrates an example of a screen of a dual folder type mobile phone that drives only a sub LCD panel.

FIG. 8 is an example of a screen of a dual type mobile phone that drives only a sub LCD panel. More specifically, FIG. 8 is an example of using only the sub LCD panel with a folder closed when using a dual folder type mobile phone. That is, in this example, when a camera installed in the mobile phone is used the folder is closed for taking pictures.

The figure on the left illustrates a case where the sub LCD panel is driven with data received from an application processor via an RGB interface, and the figure on the right illustrates a case where the sub LCD panel is driven simultaneously while application data is received from the application processor via the RGB interface and OSD data input via an SPI is simultaneously stored in a sub memory.

That is, without opening the folder of the mobile phone, information such as battery state, display size, memory capacity, and a state of a flash operation can be expressed in a variety of ways through the OSD functions using a sub LCD panel such as a view finder of a digital camera.

Figure 9:
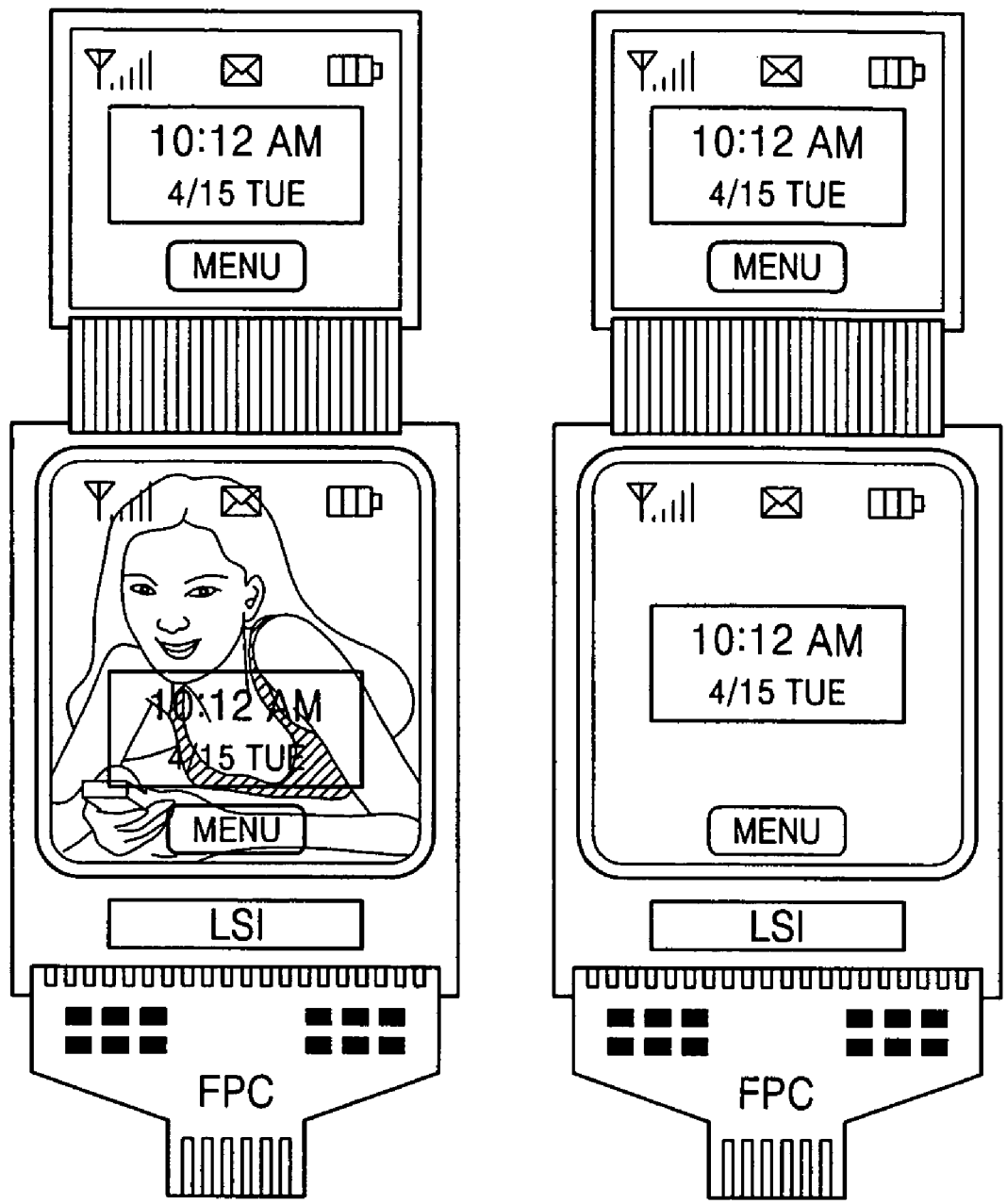
FIG. 9 illustrates an example of a screen, which simultaneously displays data stored in the sub memory on a main LCD panel and sub LCD panel.

FIG. 9 illustrates an example in which a screen displays data stored in a sub memory simultaneously on a main LCD panel and a sub LCD panel. In particular, FIG. 9 illustrates an example of a set-up in which data that is stored in a sub memory is displayed on the sub LCD panel and data regarding the battery state is displayed on the main LCD panel simultaneously while a folder is open. That is, application data and state information data may be displayed using various methods according to a user-defined mode for the screen and in the case of the right screen only data of the sub-memory can be used, thus preventing power consumption in an application processor.

In a display device according to the present invention a sub LCD memory is installed in the display device. Thus, a sub LCD panel can be driven without operation of an application processor when in a standby mode thereby reducing power consumption of the mobile phone. Furthermore, when a main or LCD panel operates through an RGB interface sub memory data may be used as OSD data, thus being more convenient for the user.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A display system, comprising:
a processor that includes a display controller which outputs application data, state display data and a picture control signal;
a display driver that receives the application data from the display controller;
a sub memory that stores the state display data and the picture control signal provided by the display controller and outputs the state display data and the picture control signal to the display driver when the processor is in both a normal operation mode and a standby mode; and
a display panel that includes a main panel which displays the application data under control of the display driver and a sub panel which displays the state display data under control of the display driver,
wherein the display driver drives the application data provided by the display controller and the state display data provided by the sub memory when the processor is in the normal operation mode, and the display driver drives the state display data provided by the sub memory bypassing the processor in the standby mode,
wherein the application data provided by the processor and the state display data provided by the sub memory are added up and input into the display driver in the normal operation mode.

2. The display system of claim 1, further comprising:
a row address decoder, which receives the state display data stored in the sub memory, and maps the state display data onto an area of the display panel.

3. The display system of claim 1, wherein the sub memory is refreshed when new state display data is input, the sub memory is not refreshed when the new state display data is not input, and when the sub memory is not refreshed, the original state display data stored in the sub memory is output to the display panel.

4. The display system of claim 1, wherein when the application data is not displayed, the state display data and the picture control signal are input and stored in the sub memory, and only the stored state display data is output.

5. The display system of claim 4, wherein the state display data is output to an area of the display panel.

6. The display system of claim 1, wherein the application data and the state display data are displayed such that they overlap in a first display area when they are output to the first display area.

7. The display system of claim 1, further comprising:
an on-screen display (OSD) controller for controlling an overlap of data on the display panel such that one of the state display data is blocked by the application data, the state display data is semi-transparently displayed on the application data, and the application data is blocked by the state display data.

8. The display system of claim 1, wherein the display panel is a mobile phone display device.

9. The display system of claim 1, wherein the main panel and the sub panel are part of a dual folder type mobile phone.

10. The display system of claim 9, wherein when the mobile phone is in a standby mode, the sub memory stores the data displayed on the sub panel.

11. A display system, comprising:
a first display panel, wherein the first display panel is a main screen display;
a second display panel, wherein the second display panel is a sub screen display;
a display driver that receives application data from a display controller which is included in a processor and outputs the application data, state display data and a picture control signal; and
a sub memory that stores the state display data and the picture control signal provided by the display controller and outputs the state display data and the picture control signal to the display driver when the processor is in both a normal operation mode and a standby mode;
wherein the first display panel displays the application data under control of the display driver and the second display panel displays the state display data under control of the display driver,
wherein the display driver drives the application data provided by the display controller and the state display data provided by the sub memory when the processor is in the normal operation mode, and the display driver drives the state display data provided by the sub memory bypassing the processor in the standby mode,
wherein the application data provided by the processor and the state display data provided by the sub memory are added up and input into the display driver in the normal operation mode.

12. The display system of claim 11, further comprising:
a row address decoder, which receives the state display data stored in the sub memory, and maps the state display data onto an area of one of the first and second display panels.

13. The display system of claim 11, wherein the sub memory does not refresh one of the first and second display panels in which the state display data is displayed, unless the picture control signal, which indicates that one of changed state display data and application data is to be displayed, is input.

14. The display system of claim 11, wherein in one of the first and second display panels in which the state display data and the application data are displayed, the sub memory does not refresh a portion of the display area in which the state display data is displayed unless the picture control signal, which indicates that changed state display data is to be displayed, is input.

15. The display system of claim 11, wherein in one of the first and second display panels in which the application data is displayed, the sub memory does not output the state display data to one of the first and second display panels unless the picture control signal, which indicates that the state display data is to be displayed, is input.

16. The display system of claim 11, wherein the state display data is output to one of a first portion of the first display panel and a first portion of the second display panel.

17. The display system of claim 11, wherein the application data and the state display data are displayed such that the application data and the state display data overlap in a first display area when the state display data and the application data, which are stored in the sub memory, are output to the first display area.

18. The display system of claim 11, further comprising:
an on-screen display (OSD) controller for controlling an overlap of data on the first and second display panels such that one of the state display data is blocked by the application data, the state display data is semi-transparently displayed on the application data, and the application data is blocked by the state display data.

19. The display system of claim 11, wherein display control of the state display data and the application data is performed using the display controller.

20. The display system of claim 11, wherein when the display device is in the standby mode, the sub memory stores data which is displayed on the second display device.

* * * * *